United States Patent [19]

Guim

[11] 4,293,104
[45] Oct. 6, 1981

[54] HAND-HELD FISHING REEL

[76] Inventor: Armando Guim, 803 SW. 36 Ave., Miami, Fla. 33135

[21] Appl. No.: 144,602

[22] Filed: Apr. 28, 1980

[51] Int. Cl.³ .............................................. B65H 75/40
[52] U.S. Cl. ................................. 242/96; 242/84.2 J; 242/84.5 R; 242/99
[58] Field of Search ................. 242/84.2 J, 96, 99, 242/84.5 R; 43/18 R, 20, 22, 43.11, 43.12, 54.5 A

[56] References Cited

U.S. PATENT DOCUMENTS

| | | | |
|---|---|---|---|
| 2,250,281 | 7/1941 | Sundstrand | 242/96 |
| 2,753,131 | 7/1956 | Erdman | 242/84.2 J |
| 2,855,717 | 10/1958 | Heil | 242/96 X |
| 3,169,723 | 2/1965 | Wilson | 242/96 |
| 4,229,900 | 10/1980 | Collins | 242/84.2 J |

FOREIGN PATENT DOCUMENTS 1059399  2/1967  United Kingdom ................. 242/96

Primary Examiner—John M. Jillions
Attorney, Agent, or Firm—John Cyril Malloy

[57] ABSTRACT

A hand-held fishing reel having an outer recess circumferential surface defining a seat for a fishing line and an inner surface having an annular groove with a recess surface. The reel includes side members sandwiching the outer and inner surfaces and forming rim zones of juncture. The reel includes an inner assembly diametrically across the inner surface comprising first and second members and hand grip means securing the members for rotatable engagement with the inner surface and the annular groove wherein the inner assembly is rotatable with respect to the reel.

6 Claims, 5 Drawing Figures

4,293,104

HAND-HELD FISHING REEL

FIELD OF THE INVENTION

This invention relates generally to hand-held fishing reels and, more particularly, to hand-held fishing reels capable of winding a fishing line.

BACKGROUND OF THE INVENTION

There have been many hand-held fishing reels of the crude variety including those wherein the arm, hand and elbow of the fisherman was used as the fishing reel. Typically, a hand-held fishing reel is a crude device and does not include movable pieces. Applicant has developed and designed a relatively simple structure wherein a user may through a handle means roll up and out a fishing line for hand-held use.

It is generally an object of this invention to provide a device wherein a fisherman desirous of using a hand-held fishing reel may use the device and conveniently fish and reel in the line without tangling or unnecessary delay.

SUMMARY OF THE INVENTION

A hand-held fishing reel of a predetermined diameter is provided having an outer recessed circumferential surface defining a seat and an inner surface having an annular groove with a recessed surface. The reel includes first and second side surfaces spaced apart from each other and sandwiching the outer and inner surfaces at rim zones of junctures. The reel has a plurality of equispaced generally coplanar, radially extending sockets extending depthwise into the inner surface. An assembly is mounted inside the reel across the inner surface and is movable with respect to the reel. The assembly includes first and second members having ends which are opposed and an outer end defining a zone having a curvature of radius substantially equal to but less than the curvature of the outer surface. Hand grip means secure the ends of the members and are rotatably received in the annular groove for spinning movement of the reel relative to said assembly. A line guide means is carried by the assembly and extends radially from the circumferential seat. Detent means are included in the assembly for selectively engaging the reel and preventing rotation selectively.

In accordance with these and other objects of the invention which will become apparent hereinafter, the invention will now be described with reference to the accompanying drawings in which:

DESCRIPTION OF THE PREFERRED EMBODIMENT

Figure 1:
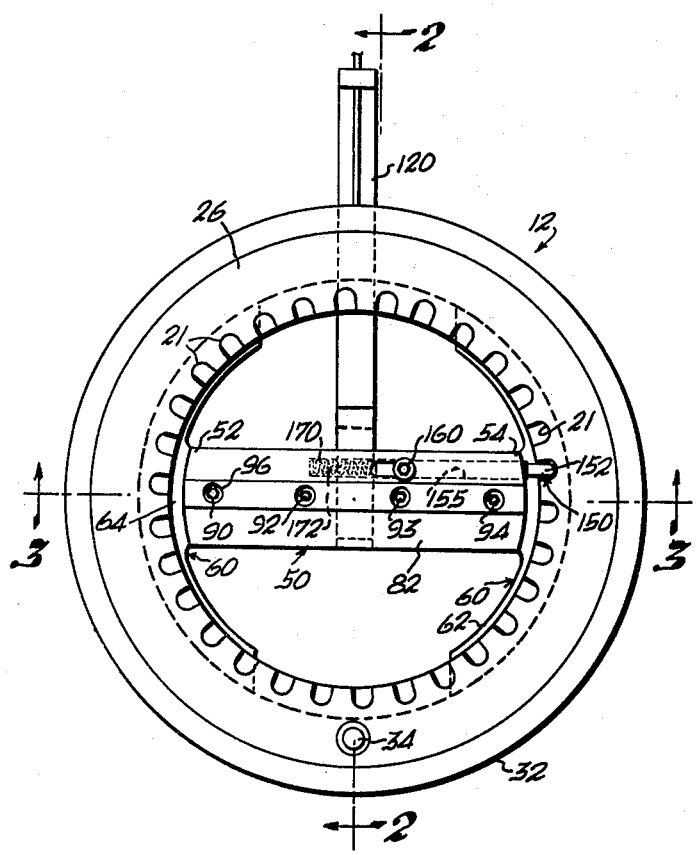
FIG. 1 is a side elevation view of the reel of the instant invention.
Figure 2:
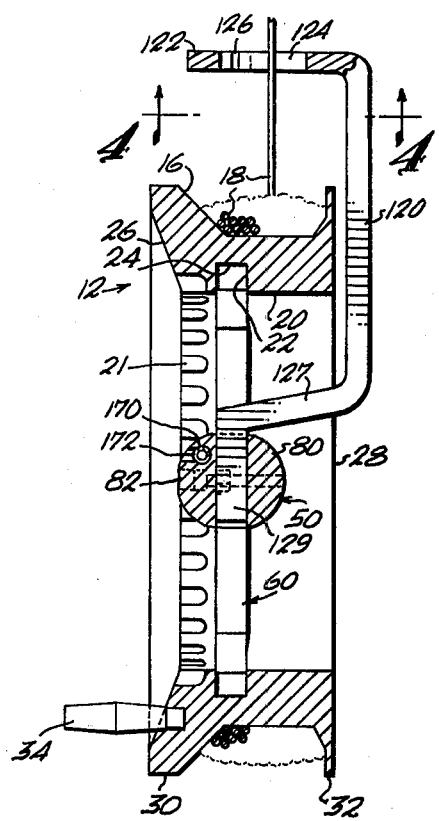
FIG. 2 is a view taken on the plane indicated by the line 2—2 of FIG. 1 looking in the direction of the arrows.
Figure 3:
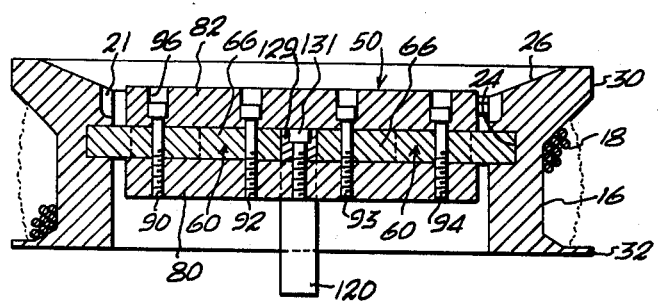
FIG. 3 is a view taken on the plane indicated by the line 3—3 of FIG. 1 looking in the direction of the arrows.

Referring to the drawings wherein like reference characters designate like or corresponding parts throughout the several views and referring particularly to FIG. 1, there is shown the invention 10 comprising a hand-held fishing reel which is generally designated by the numeral 12 and which is of a predetermined diameter, in the range of between about 6 to 12 inches. The reel has a peripheral recessed surface 16 defining a circumferential seat for a fishing line 18 and an inner surface 20 with an annular recess 22 or groove having a recessed surface 24 which is of a constant predetermined diameter. Connected to the inner and outer surface of the reel there are side surfaces 26 and 28, the first of which is preferably dish-shaped and as shown there are rims 30 and 32 which cradle the line in the circumferential seat in the preferred embodiment. Also a handle 34 is provided for spinning the reel in a manner which will be explained more fully hereinafter. As seen in FIGS. 1, 2 and 3, there are a plurality of equispaced, generally coplanar, radially outwardly extending sockets 21 in the reel extending depthwise into the inner surface 20.

An assembly 50 extends diametrically across the reel and has a first end 52 and a second end 54, the assembly being composed of a plurality of parts which will now be explained on reference, particularly, to FIGS. 2 and 3; however, first it will be helpful to refer to FIG. 5.

Figure 5:
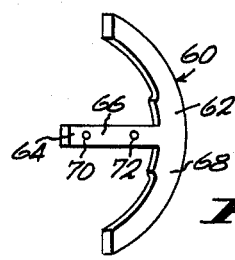
FIG. 5 is a perspective view illustrating a portion of the instant invention as will be described more fully hereinafter.

In FIG. 5 there is shown a member 60 which is also designated in FIGS. 1 and 2. This member includes an outer arcuate end 62 and an inner zone 64 and is composed of a generally T-shaped member having a stem 66 and an arcuate outer bar 68 of a radius of curvature substantially equal to but slightly less than the radius of curvature of the surface 24, see FIG. 2. A pair of holes 70 and 72 extend across each of the bar zones, 64. As seen in FIGS. 1 through 3, one of these members shown in FIG. 5 comprises the end of the assembly and are held together by outer members 80 and 82 which sandwich the confronting ends together and which are secured to one another by means of screws such as 90, 92, 93 and 94 which are preferably recessed in sockets such as 96. It will be seen that the reel is free spinning by reason of this construction with respect to the assembly 50.

Figure 4:
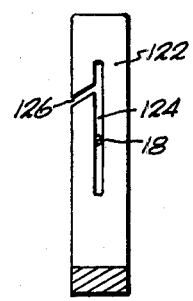
FIG. 4 is a view taken on the plane indicated by the line 4—4 of FIG. 2 looking in the direction of the arrows.

Extending upwardly from the central zone of the assembly is a line guide 120 having an outer end 122 with a slit 124 and an entrance mouth, see FIG. 4, 126 for convenient passage of the line 18 into and out of it. The line guide has an inner end portion which extends depthwise between the outer surfaces of the reel as indicated by the numeral 127 with a foot 129 which is connected to the assembly 60 at inner zone 64. When assembled line guide 120 is held in position by screw means 131 and assembled prior to the sandwiching together of the outer portions of the assembly. It is thus seen that this line guide also travels with the spinning assembly.

Means are provided to selectively restrain the reel from spinning relative to the assembly and this means, see FIG. 1, is composed of a pin generally designated by the numeral 150, having an end 152 sized to be received in sockets 21 when extended through a bore 155; and the pin 150 has an outwardly extending operator portion 160 whereby the pin can be slidably moved in a diametrical direction, generally, into and out of a recess 170 wherein a spring 172 is captivated and normally urges the pin into the detent position shown in FIG. 1 while at the same time it is yieldable upon movement thereof to store energy in the spring and permit free reeling of the device.

In Use:

The line is paid out while the pin is in the retracted position and it can thereafter be reeled in as desired.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A hand-held fishing reel comprising:

a reel of predetermined diameter having an outer recessed circumferential surface defining a seat for a fishing line and a predetermined radius of curvature and an inner surface having an annular groove with a recessed surface of a predetermined diameter, said reel having a first side surface and a second side surface spaced from said first side surface and said side surfaces sandwiching the outer and inner surfaces at rim zones of juncture, defining a first and a second rim zone, respectively, the reel having a plurality of equispaced, generally coplanar, radially extending sockets extending depthwise into the inner surface, an assembly extending diametrically across the inner surface, said assembly having a first end and a second end, said assembly comprising, a first member having a first end, a second member having a first end, said first ends being of common size and dimension and each having an outer surface of a radius of curvature substantial equal to but slightly less than the radius of curvature of the recessed surface, each of said members extending toward but not to one another, and hand-grip means securing said members together with said first ends rotatably received in said annular groove for spinning movement of the reel relative to said assembly, a line guide means carried by said assembly and extending radially outwardly of said circumferential seat to guide a line, and detent means carried by said assembly and including a generally diametrically movable pin including means normally biasing said pin into an extended position and into one of said equispaced sockets and retractable to permit, selectively, free spinning of said reel relative to said assembly for normally maintaining said reel and assembly in a fixed position relative to one another.

2. The device as set forth in claim 1 wherein the confronting ends of the first and second assembly members are held in place by screw means.

3. The device as set forth in claim 1 wherein the line guide means includes an upper end having a slit and an entrance mouth for passage of a line in and out of said mouth.

4. The device as set forth in claim 3 wherein the line guide means includes a lower end held and captivated by confronting ends of said assembly means and screw means captivating and holding in place said confronting ends and line guide means.

5. The device as set forth in claim 1 or claim 4 wherein the predetermined diameter of the reel is between 6 and 12 inches.

6. The device as set forth in claim 5 wherein the reel is made of a material resistant to the corrosive effects of sea water.

* * * * *